United States Patent [19]

Frank

[11] Patent Number: 5,721,177
[45] Date of Patent: Feb. 24, 1998

[54] NONWOVEN MOLDABLE COMPOSITE

[75] Inventor: George A. Frank, Auburn, Me.

[73] Assignee: Gates Formed-Fibre Products, Inc., Auburn, Me.

[21] Appl. No.: 261,627

[22] Filed: Jun. 17, 1994

Related U.S. Application Data

[62] Division of Ser. No. 880,624, May 8, 1992, abandoned.

[51] Int. Cl.⁶ ..................................................... B32B 3/00
[52] U.S. Cl. ..................... 442/59; 428/304.4; 428/311.5; 442/344; 442/351
[58] Field of Search ................................. 428/156, 159, 428/246, 247, 280, 283, 288, 296, 310, 373, 304.4, 311.1, 311.5; 442/344, 351

[56] References Cited

U.S. PATENT DOCUMENTS

| | | |
|---|---|---|
| 3,063,883 | 11/1962 | Emerson . |
| 3,616,031 | 10/1971 | Fleissner ........................... 156/285 |
| 5,227,236 | 7/1993 | Handermann ........................ 428/361 |

FOREIGN PATENT DOCUMENTS

| | | |
|---|---|---|
| 116845 | 8/1984 | European Pat. Off. . |
| 171807 | 2/1986 | European Pat. Off. . |
| 174813 | 3/1986 | European Pat. Off. . |
| WO88/00258 | 1/1988 | WIPO . |
| WO 09406 | 12/1988 | WIPO . |
| WO 10768 | 7/1991 | WIPO . |

*Primary Examiner*—Richard Weisberger
*Attorney, Agent, or Firm*—C. H. Castleman; H. W. Oberg; S. G. Austin

[57] ABSTRACT

A heat stabilized, moldable, consolidated nonwoven panel resistant to shrinkage when molded during a subsequent thermoforming operation, said panel being substantially stiff and comprised of a nonwoven structure of reinforcement fibers admixed throughout and encapsulated by a thermoplastic resin formed from melted and compressed thermoplastic fibers having a melting point less than the melting point of said reinforcement fibers, said reinforcement fibers comprising 60-20 percent per volume of said panel and having a length of from 1-6 inches sufficient to enable said panel to achieve at least about 50 percent elongation during thermoforming.

12 Claims, 1 Drawing Sheet

5,721,177

NONWOVEN MOLDABLE COMPOSITE

This is a division of prior application Ser. No. 07/880,624 filed May 8,1992, now abandoned.

BACKGROUND OF THE INVENTION

1. Field of the Invention

The present invention relates generally to nonwoven composite materials and, more particularly, to nonwoven fibrous panels adapted for thermoforming. Specifically, the present invention relates to nonwoven moldable composite materials having enhanced stiffness/weight ratios and enhanced resistance to shrinkage during thermoforming and their methods of manufacture.

2. Description of the Prior Art

Nonwoven needlepunch fiber technology has been utilized in the past in a variety of manners to form a diverse number of nonwoven flexible fabric materials and products. Examples of such technology for producing flexible nonwoven materials include U.S. Pat. No. 4,420,167, No. 4,258,094, No. 4,581,272, No. 4,668,562, No. 4,195,112, No. 4,342,813, No. 4,324,752, No. 4,315,965, No. 4,780,359, and No. 5,077,874.

In certain applications, however, flexible nonwoven materials having fabric-like surfaces are not the most desired product. In fact, there are certain instances where a more rigid nonwoven material is desirable, for example for use as a trunkliner to protect electronic components located in the trunk area. In certain past situations, plastics have been utilized for such applications. Historically, plastic composite panels have been manufactured using any number of different techniques. In the case of panels or materials suitable for low pressure thermoforming, which is desirable for trunkliner applications and other similar type of applications requiring molding, several processes have been utilized.

One typical process of the prior art is based on paper making technology. In this instance, short staple fiber reinforcement materials, having fiber lengths typically less than one inch, are mixed with a desired resin system, disbursed in a slurry, applied onto a porous belt, dried, and then consolidated using heat and pressure. In this instance, the desired resin system has been either a resin emulsion or additional fibrous materials of a lower melting point.

Other prior art processes rely on extrusion techniques to form a melt of the desired resin, which may or may not contain short staple fiber reinforcement materials and/or fillers. Panels are then formed by directing the molten resin through a slot die. One variation of this process uses a resin sheet which is combined with premanufactured reinforcement webs shortly after the extrusion die. These materials may be made in a sandwiched construction of resin-reinforcement-resin, and then consolidated through a compression operation consisting of high pressure rollers or presses.

In yet another prior art process, which has been used extensively for light weight textile type products such as diaper linings, interlinings, and the like, includes forming a nonwoven structure through a textile process such as carding or airlay technology of primarily reinforcement fibers. These reinforcement fibers can contain lower melting binder fibers. This nonwoven structure is then exposed to heat and pressure to form a fibrous nonwoven structure containing bond points in the structure. This is not unlike flexible textile manufacturing processes described in some of the aforementioned patents. Alternatively, the nonwoven structure may be exposed to resin systems via a spray or dip application of resin emulsions, which are then dried by way of heat and/or pressure.

Some of the drawbacks of the textile based technology discussed above, however, include the fact that if additional decorative or reinforcement materials such as carpeting or the like needs to be adhered or connected to the composite substrate material, such additional material has traditionally been needlepunched to attach it to the composite materials already formed. Such needlepunching has been shown to change the appearance of the decorative material or weaken the reinforcement materials. In the alternative, such carpeting or other decorative layer can be separately adhered to the composite substrate by use of separate adhesive applications.

Moreover, such composite materials of the past have exhibited a certain amount of shrinkage when subsequently exposed to additional heat during thermoforming processes to mold the composite into a desired shape for application as a trunkliner, dash panel or any other type of part. Such shrinkage during thermoforming can cause missizing of the desired component part. Alternatively, it requires precise prediction with respect to the amount of shrinkage in order to incorporate such shrinkage into the original panel size prior to thermoforming. Yet another alternative includes oversizing the panel so as to insure that shrinkage occurring through thermoforming would not affect the desired end product size. However, excess material must be trimmed off, and this is unnecessary waste. Therefore, there remains a need for a stiff, less flexible nonwoven composite material which is capable of being thermoformed and molded without shrinkage as well as providing alternate attachment mechanisms for decorative or reinforcement materials.

SUMMARY OF THE INVENTION

In one aspect of the invention there is provided a heat stabilized, moldable, consolidated nonwoven panel resistant to shrinkage when molded during a subsequent thermoforming operation, the panel being substantially stiff and comprised of a nonwoven substrate structure of reinforcement fibers admixed throughout and encapsulated by a thermoplastic resin formed from melted thermoplastic fibers having a melting point less than the melting point of said reinforcement fibers, the panel having assumed a densified structure resulting from said thermoplastic resin having displaced, under compressive force, a substantial amount of the air voids present in the nonwoven structure before having been subjected to such compressive force, said reinforcement fibers comprising 60–20 percent per volume of said panel and having a length of 1–6 inches sufficient to enable said panel to achieve at least about 50 percent elongation during thermoforming.

In one embodiment the composite has an air void volume no greater than approximately 20 percent.

BRIEF DESCRIPTION OF THE DRAWING

The accompanying drawing, which is incorporated in and forms a part of the specification, illustrates a preferred embodiment of the present invention and together with a description, serves to explain the principles of the invention. In the drawing.

DESCRIPTION OF THE PREFERRED EMBODIMENTS

Figure 1:
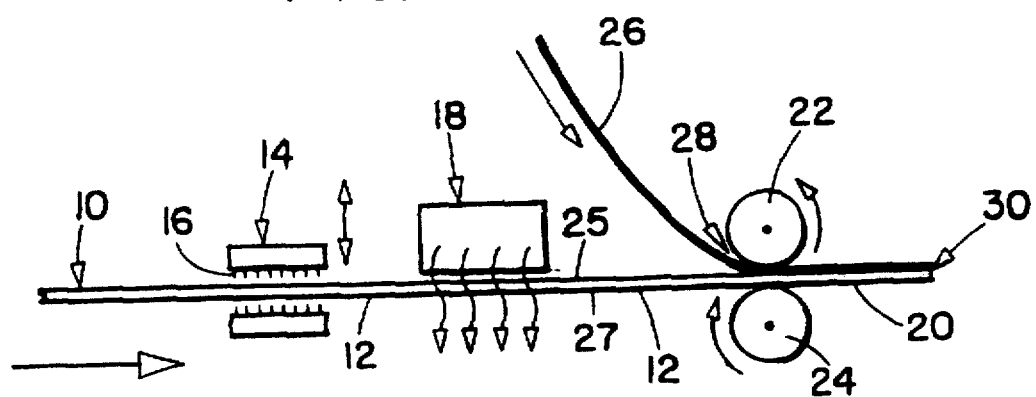
FIG. 1 is a schematic showing one embodiment of the process of the present invention used to form the material of the present invention.

In accordance with the process of the present invention, at least two different types of fibers are blended together in preparation for a batt formation process. The base or first fiber is a reinforcement fiber, while the second fiber is thermoplastic in nature and will provide the resin utilized to bond the first reinforcement fibers together as discussed below.

The first type of fiber or reinforcement fiber may be thermoplastic, thermoset, inorganic or organic in nature as long as its melting point exceeds that of the second or resin fibers. In the preferred embodiment, the first type of fiber is either a non-thermoplastic fiber or a thermoplastic fiber having a melting point as explained above. Suitable non-thermoplastic fibers available for use as a first type of fiber include, but are certainly not limited to, wool, cotton, acrylic, polybenzimidazole, aramid, rayon or other cellulosic materials, carbon, glass, and novoloid fibers. Due to their very high temperature stability, for purposes of the present invention, polybenzimidazole have been characterized as non-thermoplastic. If the the first type of fibers in the preferred embodiment are thermoplastic, the thermoplastic material must have a higher melting point temperature than the melting point temperature of the second thermoplastic fibers so that the second thermoplastic fibers may be melted without melting the first fibers. If the first fibers are thermoplastic in nature, any of the thermoplastics described below as being available for use as the second fibers are also available for the first fibers so long as the consideration stated above with respect to melting point is met. If desired, the preferred nonwoven batt may have components in addition to the above-described first and second type of fibers.

The second resin fiber may be made from any type of thermoplastic material having appropriate melting points. In the preferred embodiment, such materials include, but are not limited to, polyethylene, polypropylene, polyester, nylon, polyphenylene sulfide, polyether sulfone, polyetherether ketone, vinyon, as well as bicomponent thermoplastic fibers. In fact, bicomponent fibers may be utilized as both first and second fibers. Such bicomponent fibers include a higher melting point core material surrounded by a lower melting point sheath material. In this manner, as heat is applied and the temperature increased, the sheath material melts thereby exposing the higher melting point core material which remains as the reinforcement fiber. An example of a usable bicomponent thermoplastic fiber is one made of a polypropylene core and a polyethylene sheath. Chisso Corporation of Japan manufactures a suitable bicomponent polyolefin fiber sold as "Chisso ESC" fiber. In the most preferred embodiment, the first reinforcement fiber is a higher melting point polyester while the second thermoplastic resin fiber is a lower melting point polypropylene.

Referring now to FIG. 1, the first and second fibers described above are admixed together and formed into a batt 10 by way of typical textile processes such as carding/crosslapping or an airlay process. Typically, the second thermoplastic fibers representing the resin component of the ultimate composite will be utilized in the amount of 40–80 percent by volume of the total blend. Likewise, the first fibers representing reinforcement fibers will typically represent 20–60 percent of the blend. In the most preferred embodiment, the mix is in the ratio of 65 percent of the second resin fiber and 35 percent of the first reinforcement fiber.

The fiber is then passed through a batt formation process in order to consolidate the fibers and form a nonwoven web 12. Any type of batt formation technique known to the art may be utilized in order to form the batt 10. Examples of such techniques include carding/crosslapping operations or an airlay operation. The preferred weight of the batt 10 thus formed is about 300 g/m$^2$ or higher. In the preferred embodiment, a needlepunching technique is utilized to consolidate the batt 10 to form the nonwoven structure 12. Referring to FIG. 1, a needle loom 14 is illustrated as being utilized to consolidate the batt 10 into the nonwoven structure 12. The needle loom 14 includes needles 16 that punch into and withdraw from the webbing at desired number of strokes per minute as more specifically described in U.S. Pat. No. 4,424,250, the contents of which are specifically incorporated herein by reference.

It is important to note that the first reinforcement fibers of the batt 10 are preferably of a long but discrete length, that is of a length of 1–6 inches. This differentiates the ultimate composite 20 of the present invention from prior art types of composites, which includes those utilizing short staple fibers produced by wet-laid techniques or the like, or those utilizing continuous fibers. By maintaining the reinforcement fibers within the length specified above, it was discovered that the fibers help distribute forces encountered during thermoform molding of the composite, thereby providing certain beneficial elongation characteristics to the composite 20 of the present invention not available with prior art composite materials. This is discussed in greater detail below.

Returning to FIG. 1, the nonwoven structure 12 is heated above the melting point of the second thermoplastic fibers in order to melt the second fibers and encapsulate the first reinforcement fibers with resin. This is immediately followed by a compression operation. It was discovered that if the nonwoven structure 12 is heated to melt the second thermoplastic fibers and then immediately compressed, the melted thermoplastic fibers, or resin, becomes essentially liquid under the temperature and pressure range developed and responds by flowing throughout the web and displacing a substantial amount of the air voids present in the initial material. In fact, whereas prior art composite materials include up to 85 percent air voids volume in the ultimate composite material, the process of the present invention creates a composite 20 having encaptured air of 20 percent or less and, in the more preferred embodiment, air voids of only 10–15 percent and even less than 10 percent.

There are any number of ways known to the art of accomplishing heating of the nonwoven structure 12 to achieve densification, and these include hot calendaring, heated flat platten pressing, continuous belt fed heating stations such as used in lamination or transfer printing, and the like. A preferred method developed with the present invention involves feeding the nonwoven structure 12 through an impingement or through-air heating unit 18. In order to raise the nonwoven structure temperature above the melting point of the second thermoplastic fibers, hot air is preferably forced through the nonwoven structure by the unit 18 so as to thoroughly heat the entire nonwoven structure throughout. This is as opposed to a radiant heating unit which tends to heat the surface of the nonwoven structure to a much greater degree than the interior portion of the nonwoven structure. Since a thorough distribution of melted resin is desired with the present invention, it is important that the nonwoven structure be heated thoroughly throughout.

Immediately upon completion of the heating process by unit 18, the heated nonwoven structure with its melted thermoplastic resin is directed through a compression stage wherein, as described above, the resin flows throughout the nonwoven structure encapsulating the first reinforcement fibers and displacing the air voids therein. While any type of compression technique known to the art may be utilized with the method of the invention, the preferred embodiment utilizes a pair of pinch rollers 22, 24 which are maintained preferably at a temperature below the melting point of the resin so as to assist in cooling of the resin. The rollers 22, 24 are spaced with an appropriate gap so as to develop sufficient closure pressure at the nip 28 to cause the mobile molten resin in the nonwoven structure to redistribute within the matrix of the reinforcement fibers therein. Upon compression caused by the rollers 22, 24, the nonwoven structure is cooled to form the composite material 20. As described above, the rollers 22, 24 may assist in the initial cooling by being maintained at an appropriate lower temperature.

It is frequently desirable to utilize the composite material 20 as a substrate and add to it decorative or reinforcement covering materials. Prior to the present invention, such materials were attached to a composite formed from textile processes either by a needlepunching process, which tends to change the decoration materials appearance or weaken the reinforcing material, or by adding an additional adhesive, which added weight and required an additional processing step. With the present invention, a covering material 26 may be attached to the composite 20 by introducing the material 26 on either one 25 or both sides 25, 27 of the heated nonwoven structure at the nip point 28 to yield a finished composite material 30 having the covering material 26 attached thereto. The covering material 26 is attached to the composite 20 by compressing the covering material 26 against the surface 25 of the heated nonwoven structure so that the resin from the heated nonwoven structure penetrates the covering material 26 and thereby binds the covering material 26 to the substrate 12. Thus, the resin within the nonwoven structure also acts as the adhesive to attach the cover material 26 to the nonwoven structure to provide the final composite product 30. In the case of a decorative material, virtually any chemical type may be utilized as the covering material 26 so long as its melting point is greater than or equal to the melting point of the second thermoplastic fibers. While FIG. 1 only illustrates the attachment of the cover material 26 to one side 25 of the nonwoven structure, it is to be understood that both sides 25, 27 of the nonwoven structure can be covered by a material 26 simultaneously by introducing another covering material at the nip point 28 from the other side 27 of the nonwoven structure. The covering material 26 can be of any type of material such as textile, ie., carpets, cloths and the like, or other types of materials such as films, foils, spunbonded reinforcement materials and the like.

Since the resin system of the composite material 20 has been repositioned during its mobile or heated phase by the compression process, the resulting composite 20 is essentially free of trapped air as described above. In addition, essentially 100 percent contact exists between the resin system of the composite 20 and the first reinforcement fibers therein. Moreover, the final composite product 30 having a covering layer attached thereto is a singular material wherein the covering material 26 is intimately bound to the composite 20 by utilizing the same resin system that binds the fibers of the composite 20 together to bind the covering material 26 to the composite 20. This results in a product with performance properties similar to the extruded resin with reinforcement fibers in terms of offering a very high stiffness to weight ratio, while maintaining sufficient ultimate elongation to allow reliable thermoforming into complex shapes as described below.

As a result of the aforementioned processing, the resulting composite material 20 is a moldable, nonwoven composite. Due to the heating and compressing which densifies the material 20, the resultant composite 20 is highly resistant to shrinkage during subsequent thermoforming processes. The composite 20 ends up being a nonwoven structure of the first reinforcement fibers which are thoroughly mixed throughout and encapsulated entirely by the resin formed from the second melted fibers, the composite having an air volume of 20 percent or less and preferably in the range of 10–15 percent. Thus, substantially all of the air voids in the initial batt 10 have been displaced and removed.

The composite material 20 with or without covering material 26 may be utilized in a wide variety of applications as previously mentioned. With respect to thermoforming, the composite 20 has achieved elongation at failure values in excess of 50 percent elongation under thermoforming conditions. In other words, the composite 20 of the present invention is able to achieve in excess of 50 percent elongation during thermoform molding without cracking or failing. This makes the composite material of the present invention highly suitable for any method of shaping parts requiring heating or thermoforming techniques.

The process and product of the present invention described above differ significantly from prior art processes and products in that exclusively dry laid nonwoven structure forming technology is utilized as opposed to wet laid technology of many of the prior art products. The resultant composite structure of the invention comprises a matrix of reinforcement fibers essentially surrounded by resin material and essentially free of air spaces, which provides a very dense, stiff, yet lighter weight material. Nonetheless, this material is highly elongatable for thermoforming capabilities. Moreover, the material of the present invention allows lamination of decorative or additional reinforcement materials without the use of additional adhesive and without the use of needlepunching or other similar type of techniques which tend to damage the reinforcement material or change the appearance of the decorative material. As a result, a stiff, lighter-weight composite material is achievable with the present invention without being brittle, and yet is very compliant under thermoforming processes. This produces a composite material that is capable of being utilized in a wide variety of applications with significant advantages over existing nonwoven composites.

The foregoing description and the illustrative embodiments of the present invention have been shown in the drawing and described in detail in varying modifications and alternate embodiments. It should be understood, however, that the foregoing description of the invention is exemplary only, and that the scope of the invention is to be limited only to the claims as interpreted in view of the prior art. Moreover, the invention illustratively disclosed herein suitably may be practiced in the absence of any element which is not specifically disclosed herein.

The embodiments in which an exclusive property or privilege is claimed are defined as follows:

1. A heat stabilized, moldable, consolidated nonwoven panel having an air void volume of at least about 10 percent and resistant to shrinkage when molded during a subsequent thermoforming operation, said panel being formed of at least one layer, and being substantially stiff and comprised of a nonwoven substrate structure of reinforcement fibers admixed throughout and encapsulated by a thermoplastic resin formed from melted thermoplastic fibers having a melting point less than the melting point of said reinforcement fibers, said panel having assumed a densified structure resulting from said thermoplastic resin having displaced, under compressive force, a substantial amount of the air voids present in the nonwoven substrate structure before having been subjected to such compressive force, said thermoplastic resin comprising 40–80 percent per volume of said panel based on the total blend of reinforcement fibers plus thermoplastic resin in the panel, and said reinforcement fibers comprising 60–20 percent per volume of said panel based on the total blend of reinforcement fibers plus thermoplastic resin in the panel, and the reinforcement fibers having a length of from 1–6 inches sufficient to enable said panel to achieve at least about 50 percent elongation during thermoforming.

2. The panel of claim 1 having an air void volume no greater than about 20 percent.

3. The panel of claim 1 having an air void volume of substantially less than 85 percent.

4. The panel of claim 1 which has been molded by thermoforming to form a shaped, substantially stiff thermoformed article in which at least about 50 percent elongation has been achieved as a result of molding.

5. The panel as claimed in claim 1, wherein said reinforcement fibers comprise at least one type of non-thermoplastic fibers selected from the group consisting of fibers of wool, cotton, acrylics, polybenzimidazoles, aramids, rayon, carbon, glass, and novoloids.

6. The panel as claimed in claim 1, wherein said thermoplastic fibers forming said resin comprise at least one type of thermoplastic fiber selected from the group consisting of fibers of polyethylene, polypropylene, polyester, nylons, polyphenylene sulfides, polyether sulfones, polyether-ether ketones, vinyon, and bicomponent thermoplastic fibers.

7. The panel as claimed in claim 1, wherein said reinforcement fibers comprise polyester, and said resin forming thermoplastic fibers comprise polypropylene.

8. The panel as claimed in claim 1, wherein said reinforcement fibers comprise approximately 35 percent by volume of said blend while said resin comprises approximately 65 percent by volume of said blend.

9. The panel as claimed in claim 1, wherein said panel further includes a covering member attached to at least one surface thereof utilizing the thermoplastic resin of said substrate structure, the covering member becoming attached by compressing the covering member against the substrate structure so that the thermoplastic resin penetrates the covering member and binds it to the substrate structure upon subsequent cooling and resolidifying.

10. The panel as claimed in claim 1, wherein said covering member is secured to both sides of said material.

11. The panel as claimed in claim 1, wherein said covering member attached to said material comprises carpeting.

12. The panel of claim 9 which has been molded by thermoforming to form a shaped, substantially stiff thermoformed article in which at least about 50 percent elongation has been achieved as a result of molding.

* * * * *